No. 634,932. Patented Oct. 17, 1899.
H. C. WIRT.
LIGHTNING ARRESTER FOR ELECTRIC CIRCUITS.
(Application filed July 12, 1899.)
(No Model.)
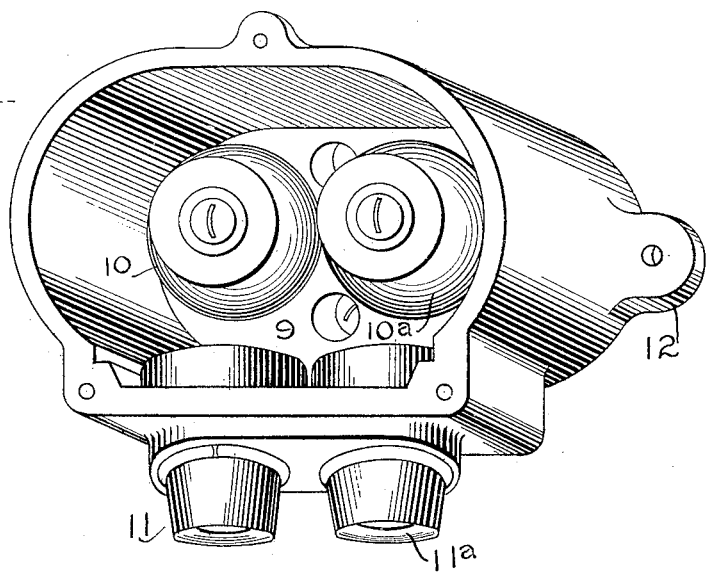
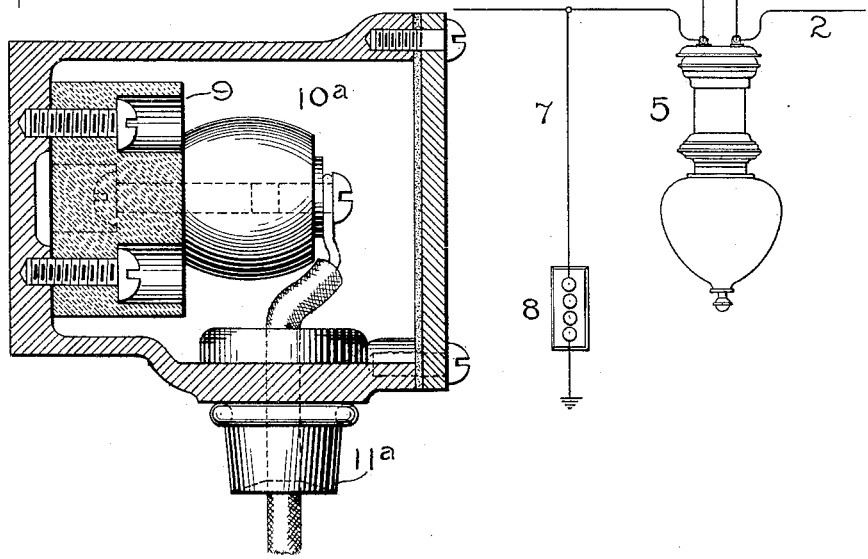
WITNESSES
Edw. Williams, Jr.
A. F. Macdonald.
INVENTOR
Herbert C. Wirt,
by Albert N. Davis
Atty.

UNITED STATES PATENT OFFICE.

HERBERT C. WIRT, OF SCHENECTADY, NEW YORK, ASSIGNOR TO THE GENERAL ELECTRIC COMPANY, OF NEW YORK.

LIGHTNING-ARRESTER FOR ELECTRIC CIRCUITS.

SPECIFICATION forming part of Letters Patent No. 634,932, dated October 17, 1899.

Application filed July 12, 1899. Serial No. 723,549. (No model.)

*To all whom it may concern:*

Be it known that I, HERBERT C. WIRT, a citizen of the United States, residing at Schenectady, county of Schenectady, State of New York, have invented certain new and useful Improvements in Lightning-Arresters for Electric Circuits, (Case No. 1,042,) of which the following is a specification.

The object of this invention is to protect translating devices included in and supplied by an electric circuit from damage by lightning. Such a protecting device may be provided for each translating device in the circuit. The common method of connecting lightning-arresters in a circuit in which translating devices are to be protected is to include the lightning-arrester in a ground branch from one side of the circuit at a point adjacent to the apparatus to be protected. I depart from this practice in including in a parallel branch circuit with each translating device a lightning-arrester and providing a ground branch for the entire circuit on more than one such branch, if necessary, thus insuring the protection of each translating device and simplifying the connection of the ground with the circuit.

In carrying out my invention I bridge the terminals of each translating device in the electric circuit which it is desired to protect by a lightning-arrester and form at one or more points of the circuit, preferably at some point under cover, a ground branch including the main circuit lightning-arrester or a device of high resistance and low inductance, which will permit but little of the dynamic energy of the circuit to leak to ground, but will afford sufficient path for the high-potential lightning.

The invention therefore comprises the connection of such an arrester in a non-inductive shunt around the terminals of the translating device to be protected, said shunt having a spark-gap or other barrier for the dynamo-current, the ground connection being completed at some other point of the circuit.

Other features of novelty will be hereinafter more fully described and claimed.

The accompanying drawings illustrate my invention.

Figure 1 is a view of a lightning-arrester with the front cover removed embodying my improvements, Fig. 2 being a sectional view of the same, and Fig. 3 showing an electric circuit or supply system embodying my improvements.

Referring first to Fig. 3, 1 and 2 represent the supply-wires of an electric circuit, including a series of translating devices 3 4 5, shown specifically as arc-lamps, though it will of course be understood that the improvements are applicable to other types of circuits—as, for example, constant-potential circuits—and other types of translating devices. Each arc-lamp, as will be seen from the diagram, has its terminals bridged by a spark-gap, as indicated at 6 $6^a$ $6^b$. At some suitable point in the circuit a common ground branch 7 may be connected with one of the supply-leads, said branch including a spark-gap or high-resistance device for permitting a leakage of the lightning to ground. As shown in the diagram, a high-resistance device 8 is provided, being preferably made of a compound of very high resistance, such as a mixture of graphite and clay or any other suitable compound which will offer low inductance and therefore permit the lightning to readily find an earth, but will effectually prevent any considerable leakage from the source of energy to the supply-circuit. This ground branch may be located at any suitable point in the system and may be put under cover, where its condition can be examined and it will be free from exposure to the weather. I have shown but a single ground branch for the circuit. It will, however, be understood that more than one may be used, if desired, particularly where the circuit is of considerable length. The lightning-arrester employed to shunt each translating device may be mounted upon the translating device or as closely adjacent thereto as convenient. Figs. 1 and 2 show an organization convenient for such use, comprising an iron casing, within which are mounted upon a support 9, of porcelain or other suitable insulator, two buttons of non-arcing metal, formed of zinc or some alloy thereof and indicated at 10 $10^a$. They are secured to the insulating-support by screws passing through a recess in the rear of the same.

The containing-box is provided with a cap or cover, the edges being packed to make it waterproof, as indicated in Fig. 2. The leads from the terminals of the translating devices may be taken through porcelain bushings 11 11ª in the bottom of the casing. Ears or lugs with screw-holes may be provided at the sides of the casing for screwing it fast to a support, as indicated at 12.

In a circuit equipped with my improvement as herein described the translating devices are not disturbed by a lightning-stroke, but when any point of the system is raised to a high potential by the lightning-discharge an arc is immediately sprung and extinguished across the spark-gap of the adjacent translating device, and proceeds thence to the next translating device, leaping the spark-gap at that point, and is thus handed on from translating device to translating device until the earth branch is reached, when a discharge takes place to ground. Each translating device is protected from damage by the lightning-stroke by the relatively high resistance it offers to the transit of the high-frequency currents, of which the lightning is constituted, comparatively to the resistance offered by the spark-gap. For all high-frequency currents a comparatively small inductive resistance is sufficient to divert the currents over a considerable non-inductive path. In arc-lamps the regulating-coils of course offer a considerable inductive barrier, and the lightning selects, by preference, the path by way of the spark-gap. The fact that there are a number of spark-gaps in the discharge-circuit, or may be such a number before a ground is reached, does not interfere with the effectiveness of the protection, since the course of the lightning with reference to each particular translating device is determined solely by the relative inductive conditions of the by-pass and lamp-circuits. In this way each lamp organized as described takes care of the lightning-stroke, so far as its own mechanism is concerned, and the discharge finds the nearest path to ground over the lines. In a constant-potential circuit the lightning would leap but a single spark-gap and then discharge through one of the mains to the main lightning-arrester, where it would be earthed.

What I claim as new, and desire to secure by Letters Patent of the United States, is—

1. The combination with a supply-circuit, of a plurality of translating devices connected therewith, each translating device containing a lightning-arrester bridging its terminals, and a ground branch for the circuit common to several lightning-arresters.

2. The combination with a constant-current circuit, of a plurality of translating devices supplied thereby, lightning-arresters bridging the terminals of the several translating devices, and a ground connection for the circuit common to several translating devices.

3. The combination with an electric circuit containing a plurality of arc-lamps connected in series, each arc-lamp having its terminals bridged by a shunt of low inductance including a spark-gap, of a ground branch common to several lamps connected to one of the supply-wires.

4. The combination with an electric circuit, of a plurality of arc-lamps connected in series relation thereto, a by-path of low inductance across the terminals of each arc-lamp, said by-path including a spark-gap, and a ground branch of high resistance and low inductance common to several of the arc-lamps.

5. The combination with an arc-lamp, of a non-inductive path bridging its terminals, said path including a spark-gap across a medium of high dielectric resistance.

In witness whereof I have hereunto set my hand this 7th day of July, 1899.

HERBERT C. WIRT.

Witnesses:
BENJAMIN B. HULL,
MABEL E. JACOBSON.